Figure 1:
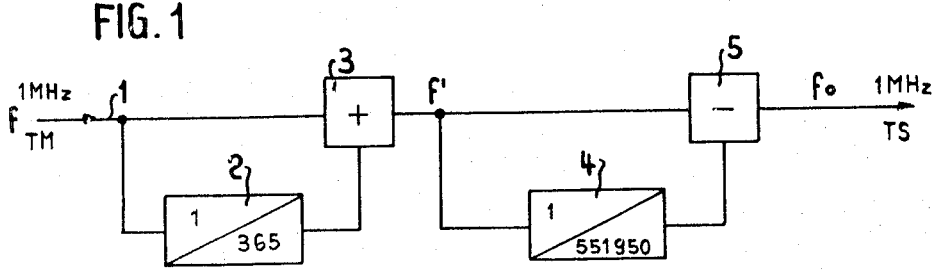

United States Patent

[11] 3,629,709

| [72] | Inventor | Jean Engdahl |
| | | Neuchatel, Switzerland |
| [21] | Appl. No. | 885,884 |
| [22] | Filed | Dec. 17, 1969 |
| [45] | Patented | Dec. 21, 1971 |
| [73] | Assignee | S. A. Ebauches |
| | | Neuchatel, Switzerland |
| [32] | Priority | Dec. 20, 1969 |
| [33] | | Switzerland |
| [31] | | 19087/68 |

[54] ELECTRONIC FREQUENCY CONVERTER
8 Claims, 5 Drawing Figs.

[52] U.S. Cl. .................................................... 328/15,
58/4, 58/33, 307/215, 307/220, 328/30, 328/39
[51] Int. Cl. ................................................ H03b 19/00
[50] Field of Search .................................... 58/4, 33;
307/215, 218, 220; 328/15, 30, 39, 41, 48, 99,
224; 324/181, 40–58; 331/25

[56] References Cited
UNITED STATES PATENTS

| 2,851,596 | 9/1958 | Hilton .......................... | 328/48 |
| 3,050,685 | 8/1962 | Stuart, Jr. .................... | 328/48 |
| 3,151,314 | 9/1964 | Root et al. ................... | 307/220 |
| 3,226,568 | 12/1965 | Samwel ....................... | 307/218 |
| 3,241,038 | 3/1966 | Amato .......................... | 307/218 |
| 3,286,234 | 11/1966 | Hogrefe ........................ | 307/220 |
| 3,405,369 | 10/1968 | Couvillon ..................... | 331/25 |
| 3,286,191 | 11/1966 | Cornwell ...................... | 328/48 |

*Primary Examiner*—Stanley T. Krawczewicz
*Assistant Examiner*—R. E. Hart
*Attorney*—Edward T. Connors

ABSTRACT: An electronic frequency converter for digitally converting the frequency of a first pulse series at a frequency corresponding to mean time or atomic time into a pulse series at a frequency corresponding to sidereal time by pulse addition and pulse subtraction.

ELECTRONIC FREQUENCY CONVERTER

This invention relates to an electronic frequency converter for time measuring purposes, this converter being applicable generally for any frequency conversion which cannot be done readily by multiplication or division. The converter is particularly suitable for transforming a frequency corresponding to mean time or atomic time into a frequency corresponding to sidereal time.

The ratio between these frequencies is
$$K = f_{TS}/f_{TM} 1.002737909265 + d59.10^{-12} \cdot t_J$$
wherein $t_J$ is the time in Julian centuries counted from 1900. In 1968 the ratio was:
$$K = 1.002737909305$$

Various devices have been used in the past for carrying out this transformation.

An electromechanical converter comprises a synchronous motor energized by an amplifier at a frequency in mean time, a gear train and an alternator. When the motor and the alternator have the same number of poles the gear train has to produce the ratio $K$ at the desired precision. Various gear trains have been suggested. However, these gear trains have wheels with high numbers of teeth, it being difficult to cut such wheels.

It is possible to arrive at t precision in the order of $1.10^{-9}$ with a train of four wheels. However, the mechanical errors of the toothing, the mechanical play and angular imperfections of the motor and alternator produce phase instabilities which are often inacceptable. Further, since such an apparatus should continuously operate over long periods of time, serious problems arise due to wear.

A prior converter including a phase shifter comprises a frequency divider for transforming a high input frequency to a value suitable for energizing a motor for rotating a phase-shifting element, for instance a rotating transformer or a rotating variable condenser through a suitable gear train. In this case mechanical errors may be reduced, but the drawbacks due to movable elements cannot fully be eliminated.

Other prior apparatus have been based on an electronic frequency conversion. However, it is difficult to obtain frequency multiplication by ratios well above 10 without affecting the reliability of the system. The frequency conversion feasible with such prior systems only allows a rough approach to the theoretical values and correction by means of a rotating phase-shifter is still necessary. The rotating speed may be reduced, but the drawbacks mentioned above cannot be avoided.

This invention aims in providing a fully electronic frequency converter avoiding all disadvantages of prior systems. The frequency converter according to this invention broadly comprises an input circuit for producing a pulse series at an input frequency, at least one converting circuit including a frequency divider and a pulse adding or pulse subtracting stage, said frequency divider and said stage including an input for a series of input pulses and said stage having another input for a pulse series from the output of said frequency divider. In such a digital converter the input frequency is changed by adding and/or subtracting pulses for obtaining a correct mean output frequency. This converter allows to reach high precision and to change in a relatively simple manner the conversion ratio within relatively wide limits. Mechanical elements may completely be avoided.

This invention will now be explained in detail with reference to the accompanying drawing showing, by way of example, an embodiment of the converter adapted to change a frequency in mean time into a frequency in sidereal time.

Figure 2:
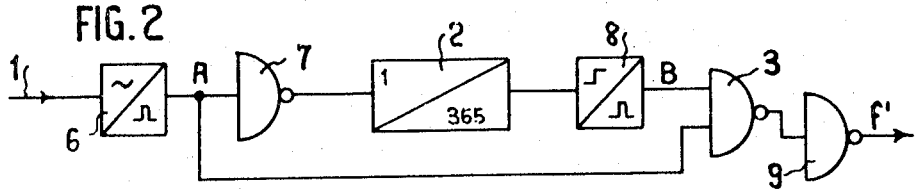
Figure 3:
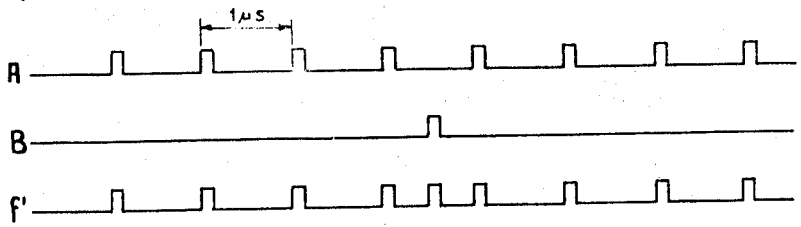
Figure 4:
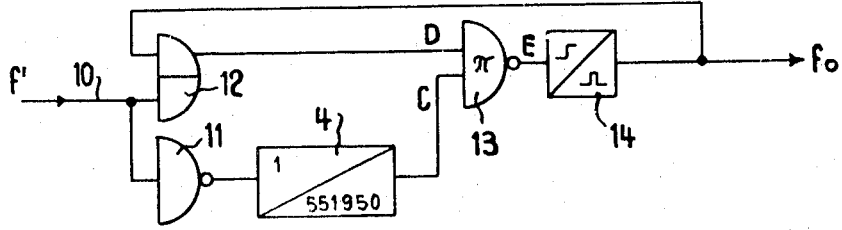
Figure 5:
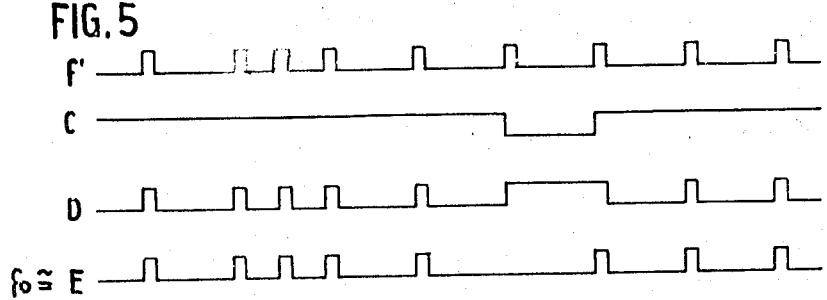

FIG. 1 is a block diagram of the converter,
FIG. 2 is a diagram of a first converting circuit,
FIG. 3 illustrates some typical signals appearing in the circuit of FIG. 2,
FIG. 4 illustrates a second converting circuit and
FIG. 5 illustrates some signals appearing in the circuit of FIG. 4.

The converter schematically illustrated in FIG. 1 has two converting circuits connected in series. A standard frequency in mean time produced by a high-precision oscillator is applied through input 1 to a frequency divider 2 having a division ratio of 1:365 and to an adding stage 3. The output frequency $f'$ of stage 3 is applied to the input of another frequency divider 4 and to the one input of a subtracting stage 5. The division ratio of frequency divider 4 is 1:551 950. The output frequency of the subtracting stage 5 corresponds to sidereal time.

Assuming that momentary errors of ±1 microsecond are without importance for the kind of measurement using sidereal time, an input frequency of 1 mc. (mean time) is used. Since the ratio
$$(f_{TS} - f_{TM})/f_m \cong 365$$
a first correction is made in adding a pulse between two succeeding pulses at 1 mc. at every 365th μsec. by means of the frequency divider 2 and the adding stage 3.

The mean frequency thus obtained is

|   |              |   |                    |     |
|---|--------------|---|--------------------|-----|
|   | $f_{TM}$     | = | 1 000 000          | Hz. |
| + | $f_{TM}/365$ | = | 2 739,702 603      | Hz. |
|   | $f'$         | = | 1 002 739,726 027  | Hz. |
| but | $f_{TS}$   | = | 1 002 737,909 305  | Hz. |
| An error of $E'$ | | = | +1,816 722 | |
|   |              |   | remains.           |     |

The foregoing operation is repeated, but this time one pulse is eliminated at the end of each period equal to that of $E'$, that is
$$f'/E' = 551\,950 \text{ pulses of } f'$$
This operation is executed by means of the divider 4 and the subtracting stage 5.

With the selected ratios, the precision is in the order of $2.10^{-6}$ after the first correction and in the order of $4.10^{-13}$ after the second correction. By changing the division ratio of the second circuit the time scale may finely be adjusted.

If $f$ is the input frequency, $f'$ is the frequency after the first correction, $fo$ is the output frequency, $n$ is the ratio of divider 2 and N is the ratio of divider 4:
$$f' = f + f/n = f(1 + 1/n)$$
$$f1 = f' + f/N = f'(1 - 1/N)$$
whereof
$$fo = f(1 + 1/n)(1 - 1/N);$$
by diferentiation with respect to N
$$dfo/dN = f(1/N^2 + 1/nN^2) \cong f/N^2 \text{ because } n \gg 1.$$
By changing the division ratio $N$ by one unit $fo$ may be modified by
$$\Delta f/f \cong 1/(0,552 \cdot 10^6)^2 \cong 3,3 \cdot 10^{-12}.$$

If the division by $N$ is done by means of a preselection divider the system may be adapted to any time scale or time definition (for instance if $f$ is an atomic frequency) and an error of less than 50 μsec. per year may be warranted.

The addition and subtraction of pulses causes a jitter equal to ±1 period of the input signal. Due to the two successive corrections a slight phase modulation at the frequencies
$$f/365 \cong 2,74 \text{ kHz.}$$
$$\text{and } f'/551,950 \cong 1,8 \text{ Hz.}$$
is obtained, but this is of no importance for astronomic measurements where the microsecond is generally more than sufficient and where high stability over long measuring periods is much more interesting.

FIGS. 2 and 4 illustrate embodiments of two converting circuits as used in the converter of FIG. 1. The circuit shown in FIG. 2 has an input circuit 6 for forming a series of pulses at the frequency $f$ of the sinusoidal input signal. The series of output pulses from circuit 6 is shown in diagram A of FIG. 3. This pulse series is applied to the input of a NOR-gate 7 and to the one input of a NOR-gate 3 operating as an adding stage. The pulses are inversed and phase-shifted by gate 7 and then applied to frequency divider 2. The output pulses of divider 2 are formed in a pulse-forming circuit 8. The shifted pulses are thus applied to the second input of gate 3 as shown in diagram B of FIG 3. After passage through an output gate 9 the pulses have a mean frequency $f'$ as shown in FIG. 3.

These pulses of the mean frequency $f'$ are now applied to the input 10 of the converting circuit according to FIG. 4, having two input circuits, namely a NOR-gate 11 preceding the frequency divider 4 and the one input of a flip-flop 12. The outputs of the frequency divider 4 and of the flip-flop 12, C and D respectively, are connected to the inputs of an NAND-gate 13. The output pulses of this gate 13 are formed in a pulse-forming circuit 14 and the output pulses of this circuit 14 constitute the output signal of the desired mean frequency $fo$. The output of circuit 14 is connected to the second input of flip-flop 12.

Normally, each input pulse of the pulse series $f'$ changes the condition of flip-flop 12 such that the pulse is transmitted through the flip-flop, input D of gate 13, through this gate and circuit 14 to the output of the converter. By each output pulse the flip-flop 12 acting as a memory is reset into its initial condition in which the flip-flop is ready for receiving and transmitting another input pulse. At the beginning of each 551,950the pulse the output of frequency divider 4 changes from a rest condition to a pulse condition and returns to rest condition at the beginning of the next input pulse of frequency $f'$, as shown by diagrams $f'$ and C in FIG. 5. During pulse condition at the output of divider 4 gate 13 is closed and the pulse of $f'$ by which the output of divider 4 has been set to pulse condition does not pass through gate 13 and is thus eliminated. Since this eliminated pulse is not fed back to the one input of flip-flop 12 the latter is not reset into its initial condition. This condition is indicated by the lengthened pulse in diagram D of FIG. 5. At the beginning of the next pulse the condition at the output of frequency divider 4 changes as indicated in diagram C of FIG. 5. An output pulse is thus emitted by gate 13, this pulse passing through circuit 14 as an output pulse of the pulse series $fo$. At the same time, flip-flop 12 is now reset into its initial condition. It is thus seen that each 551,950th pulse is eliminated by circuit 5 illustrated in detail in FIG. 4.

The frequency converter described above may be used for any desired frequency conversion where comparable problems arise. While the converter is particularly favorable for a transformation from mean time to sidereal time, it may be used in any other application concerning time measurement or any other field of technique or science.

What is claimed is:

1. An electronic frequency converter for transforming a frequency corresponding to mean time time into a frequency corresponding to sidereal time, comprising an input circuit for producing a pulse series at an input frequency corresponding to mean time, a first-converting circuit including a first-frequency divider and a pulse-adding stage, said input circuit being connected to said pulse-adding stage directly and through said first-frequency divider in order that the divided frequency and input frequency are added, and a second-converting circuit including a second-frequency divider and a pulse-subtracting stage, the output of said pulse-adding stage being connected directly and through said frequency divider of the second-converting circuit to said pulse-subtracting stage for subtracting the output frequency from said second-frequency divider from the output frequency from said first-frequency divider, the output frequency from said second-converting circuit being a frequency corresponding to sidereal time.

2. A converter according to claim 1, wherein said first-converting circuit has a first-frequency divider with a ratio of 1:365 and said second-converting circuit has a second-frequency divider with a ratio of 1:551,950.

3. A converter according to claim 1, comprising means for shifting the pulses fed to said pulse-adding stage from said first-frequency divider.

4. A converter according to claim 3, comprising a shifting stage series-connected with the first-frequency divider.

5. A converter according to claim 1, wherein said pulse-adding stage is an NOR gate.

6. A converter according to claim 1, wherein said pulse-subtracting stage is a NAND gate.

7. A converter according to claim 1, wherein said second-converting circuit which includes a pulse-subtracting stage has an input flip-flop memory circuit adapted to be reset by the output pulses.

8. A converter according to claim 7, wherein a NOR gate is connected into the input of said second-frequency divider and the outputs of the flip-flop memory circuit and of the second-frequency divider are connected to a NAND gate.

* * * * *

UNITED STATES PATENT OFFICE
CERTIFICATE OF CORRECTION

Patent No. 3 629 709      Dated December 21, 1971

Inventor(s) Jean Engdahl

It is certified that error appears in the above-identified patent and that said Letters Patent are hereby corrected as shown below:

Change the priority date from "December 20, 1969" to

--December 20, 1968--.

In claim 1, line 2, before "into" cancel "time".

Signed and sealed this 8th day of August 1972.

(SEAL)
Attest:

EDWARD M. FLETCHER, JR.      ROBERT GOTTSCHALK
Attesting Officer      Commissioner of Patents